US009768426B2

(12) United States Patent
Laderer et al.

(10) Patent No.: US 9,768,426 B2
(45) Date of Patent: Sep. 19, 2017

(54) COVER FOR AN ELECTRO-CHEMICAL DEVICE

(71) Applicants: ElringKlinger AG, Dettingen (DE); Bayerische Motoren Werke Aktiengesellschaft, Munich (DE)

(72) Inventors: Mark Laderer, Grabenstetten (DE); Wolfgang Fritz, Metzingen (DE); Hubertus Goesmann, Auernheim (DE); Axelle Hauck, Neubiberg (DE); Christian Zachar, Groebenzell (DE)

(73) Assignees: ElringKlinger AG, Dettingen (DE); Bayerische Motoren Werke Aktiengesellschaft, Munich (DE)

( * ) Notice: Subject to any disclaimer, the term of this patent is extended or adjusted under 35 U.S.C. 154(b) by 97 days.

(21) Appl. No.: 14/087,231

(22) Filed: Nov. 22, 2013

(65) Prior Publication Data
US 2014/0079982 A1    Mar. 20, 2014

Related U.S. Application Data

(63) Continuation of application No. PCT/EP2012/060308, filed on May 31, 2012.

(30) Foreign Application Priority Data

Jun. 1, 2011   (DE) .................... 10 2011 076 889

(51) Int. Cl.
*H01M 2/10*    (2006.01)
*H01M 2/20*    (2006.01)
*H01G 9/08*    (2006.01)

(52) U.S. Cl.
CPC ............ *H01M 2/1061* (2013.01); *H01G 9/08* (2013.01); *H01M 2/1016* (2013.01);
(Continued)

(58) Field of Classification Search
CPC ..... H01M 10/425; H01M 2/1061; H01G 9/08
(Continued)

(56) References Cited

U.S. PATENT DOCUMENTS 4,581,304 A    4/1986 Beatty et al.
6,602,637 B1   8/2003 Kurasawa et al.
(Continued)

FOREIGN PATENT DOCUMENTS

DE    833 517     3/1952
DE    35 44 003   6/1987
(Continued)

OTHER PUBLICATIONS

Machine translation of WO 2012/025169A1.*

*Primary Examiner* — Patrick Ryan
*Assistant Examiner* — Victoria Lynch
(74) *Attorney, Agent, or Firm* — Womble Carlyle Sandridge & Rice LLP (57) ABSTRACT

A cell contacting system for an electro-chemical device is provided, which has a reduced weight and yet a high security against damage. The electro-chemical device includes a plurality of electro-chemical cells, a cover which includes a carrier element, on which there is arranged at least one cell connector for the electrically conductive connection of a first cell terminal of a first electro-chemical cell and a second cell terminal of a second electro-chemical cell, and a cover element for covering the at least one cell connector, the cover element including a covering film.

12 Claims, 3 Drawing Sheets

(52) U.S. Cl.
CPC ....... *H01M 2/1077* (2013.01); *H01M 2/1094* (2013.01); *H01M 2/206* (2013.01)

(58) Field of Classification Search
USPC .................................................. 429/82, 159
See application file for complete search history.

(56) References Cited

U.S. PATENT DOCUMENTS

| | | | |
|---|---|---|---|
| 6,929,882 B1 * | 8/2005 | Carter | H01M 2/1005 429/175 |
| 2002/0182480 A1 | 12/2002 | Hanauer et al. | |
| 2007/0241021 A1 * | 10/2007 | Hiltunen | B29C 51/02 206/521.1 |
| 2011/0076521 A1 * | 3/2011 | Shimizu | H01M 2/1061 429/7 |
| 2013/0164470 A1 * | 6/2013 | Oppermann | B29B 11/16 428/35.6 |

FOREIGN PATENT DOCUMENTS

| | | | | |
|---|---|---|---|---|
| DE | WO 2012025169 A1 * | 3/2012 | | B29B 11/16 |
| EP | 2 026 387 | 2/2009 | | |
| EP | 2 290 731 | 3/2011 | | |
| JP | 2000-223095 | 8/2000 | | |
| JP | 2003-77426 | 3/2003 | | |
| KR | 10-2002-0070586 | 9/2002 | | |
| KR | 10-2007-0080863 | 8/2007 | | |
| WO | WO 87/07434 | 12/1987 | | |

\* cited by examiner

COVER FOR AN ELECTRO-CHEMICAL DEVICE

CROSS-REFERENCE TO RELATED APPLICATIONS

The present application is a continuation of international application number PCT/EP2012/060308, filed May 31, 2012, which claims priority to German patent application number 10 2011 076 889.0, filed Jun. 1, 2011, the entire specification of both being incorporated herein by reference.

FIELD OF THE DISCLOSURE

The present invention relates to a cover for an electro-chemical device which comprises a plurality of electro-chemical cells.

BACKGROUND

Currently known cell contacting systems for electro-chemical devices comprise a relatively thick cover plate consisting of a polypropylene material that is manufactured in an injection molding process.

SUMMARY OF THE INVENTION

The object of the present invention is to produce a cell contacting system for an electro-chemical device which is of reduced weight but which nevertheless is well protected from damage.

In accordance with the invention, this object is achieved by a cover for an electro-chemical device which comprises a plurality of electro-chemical cells, wherein the cover comprises the following:
- a carrier element on which there is arranged at least one cell connector for connecting a first cell terminal of a first electro-chemical cell and a second cell terminal of a second electro-chemical cell in an electrically conductive manner, and a cover element for covering the at least one cell connector,
- wherein the cover element comprises a covering film.

Preferably, the cover element is substantially entirely in the form of a covering film.

In the present description and in the accompanying Claims, a film is to be understood as a flat body which bends limply in the unshaped starting state, i.e., which can accommodate tensile forces only in the two spatial directions in which the flat body extends, but not compressive forces and cannot accommodate bending moments.

In particular, such a film is not dimensionally stable in the unshaped starting state.

The average material thickness of such a film is significantly smaller than its length and width, in particular, smaller than 5% of the length and/or smaller than 5% of the width.

In contrast thereto, a cover element manufactured in the form of an injection molded part has a significantly larger average wall thickness since the wall thickness in the case of injection molded parts cannot be arbitrarily reduced in view of the flow behavior of the melted injection molding material in the injection mold.

The at least one cell connector is accessible for assembly, maintenance or repair purposes when the cover element has been removed from the carrier element.

When assembling the electro-chemical device, the cover element is fixed to the carrier element, preferably in releasable manner, so that the cover formed from the cover element and the carrier element is configured to be easily handled as a composite assembly.

Thereby, the electro-chemical device can comprise one or more electro-chemical modules.

In this description and in the accompanying Claims, a "cover" for an electro-chemical device is to be understood as each element that is provided for covering at least a part of the electro-chemical device. In particular thereby, the covered part can be an electro-chemical module of the electro-chemical device or else just a part of an electro-chemical module.

The cover element is preferably in the form of a deep-drawn part.

As an alternative or in addition thereto, provision may be made for the cover element to be manufactured by a thermoforming process or an in-mold forming process.

The thermoforming process or thermoforming is a process for the shaping of thermoplastic synthetic materials which is also referred to as heat-forming, deep-drawing or vacuum deep-drawing. For the purpose of thermoforming films (up to a material thickness of approximately 1.5 mm), the semi-finished film that is to be reshaped can be supplied as a roll from a thermoforming automat.

In the case of one possible implementation of the thermoforming process, the film is heated on one or both sides by means of radiant heaters in a heating station. The film is held fast by means of a clamping frame in a tool station. A pre-stretcher and a thermoforming tool are driven through the plane of the film and roughly define the contour that is to be produced. The film is then subjected to compressed air on the one side and a vacuum on the other side in order to rapidly convey the film to the (e.g. water-cooled) wall of a forming tool. The air between the film and the forming tool escapes through holes or slots. The now rigidly shaped, cooled film is separated from the forming tool and supplied to a stamping station. There, the overall dimension and holes too if necessary are punched into the finished workpiece. Subsequently, the finished shaped workpiece is removed from the thermo-molding machine and stacked and/or packed for example.

In order to achieve adequate mechanical rigidity of the cover element, the cover element can be provided with at least one stiffening channel and/or with at least one reinforcing rib.

For the purposes of connecting the cover element to the carrier element of the cover, preferably in a releasable manner, it is expedient if the cover element comprises an edge region which projects towards the carrier element and at which the cover element is connected to the carrier element.

In connection therewith, it is particularly expedient if the edge region of the cover element at least partly overlaps an edge region of the carrier element which projects towards the cover element.

The edge region of the cover element may be fixed to the carrier element and in particular clamped to the carrier element by means of a clamping element in the form of a clamping frame for example.

In connection therewith, the clamping element is preferably arranged on the side of the cover element remote from the carrier element, in particular, on an outer surface of the cover element remote from the carrier element.

As an alternative or in addition thereto, provision may be made for the cover element to be latched to the carrier element.

Preferably, the cover element is latchable to the carrier element by means of a latching device which comprises one or more latching elements that are provided on the cover element and one or more latching elements that are provided on the carrier element.

In a preferred embodiment of the invention, provision is made for the cover element to comprise a thermoplastic material, in particular, polypropylene.

It is particularly expedient, if the cover element is formed substantially entirely of a thermoplastic material, in particular, of polypropylene.

The covering film preferably has an average material thickness of at most approximately 1.5 mm, particularly of at most approximately 1.0 mm, and particularly preferred, of at most approximately 0.6 mm.

In a special embodiment of the cover in accordance with the invention, provision is made for the cover to comprise at least one cell connector for connecting a first cell terminal of a first electro-chemical cell of the electro-chemical device and a second cell terminal of a second electro-chemical cell of the electro-chemical device in an electrically conductive manner.

In particular, provision may be made for the cover with the cell connectors arranged thereon to form a cell contacting system for contacting the cell terminals of the electro-chemical device.

In order to protect the cell connectors from accidental damage, it is expedient if at least one cell connector is arranged between the carrier element and the cover element.

In order to enable the cell connector to be connected to a cell terminal of an electro-chemical cell of the electro-chemical device in a simple manner, preferably by means of a substance-to-substance bond, it is of advantage if the carrier element has at least one passage opening through which a contact region of such a cell connector is connectable to a cell terminal of an electro-chemical cell of the electro-chemical device.

In order to enable lines, in particular voltage tapping lines and temperature measuring lines which lead to the cell connectors of the electro-chemical device or to other functional elements of the electro-chemical device, to be mounted on the cover in a particularly simple manner, it is of advantage if the cover comprises at least one conduit system, wherein the conduit system comprises at least one line which is connected in an electrically conductive manner to a cell connector for connecting a first cell terminal of a first electro-chemical cell and a second cell terminal of a second electro-chemical cell of the electro-chemical device, or to another functional element, in particular, to a power terminal of the electro-chemical device.

It is particularly expedient if the cover comprises at least one conduit system for connecting a plurality of voltage tapping points and/or temperature measuring points of the electro-chemical device to a monitoring unit of the electro-chemical device which comprises multiple voltage tapping lines and/or multiple temperature measuring lines.

In this way, the multiple voltage tapping lines and/or the multiple temperature measuring lines are already configured to be handled as a unit before making the connection to the cell connectors or the other functional elements of the electro-chemical device, preferably by means of a substance-to-substance bond.

Such a conduit system may comprise, in particular, a reinforcing structure on which the lines extending to the functional elements are held, preferably in a releasable manner.

In turn, the reinforcing structure itself can be fixed to the carrier element or else formed in one-piece manner with the carrier element.

Particularly good protection of the lines of the conduit system of the cover is achieved if the conduit system is arranged between the carrier element and the cover element.

Furthermore, it is expedient if the cover has at least one through channel for accommodating a power terminal of the electro-chemical device by means of which the electro-chemical device is connectable to other devices in an electrically conductive manner, or, an electro-chemical module of the device is connectable to other electro-chemical modules of the device in an electrically conductive manner.

In particular, provision may be made for the cover to comprise at least two through channels which together form an annular enclosed through shaft for accommodating a power terminal of the electro-chemical device.

In connection therewith, one of the through channels can be arranged on the carrier element and another through channel on the cover element.

The film cover in accordance with the invention enables a significant reduction in the weight of the electro-chemical device to be obtained.

By the use of a manufacturing process differing from an injection molding process, in particular, a thermoforming process or an in-mold-forming-process (for the production of hybrid parts), there is producible a covering film which forms a component of the cover element or else substantially forms the entire cover element of the cover but which is thin compared with an injection molded part.

The weight of the cover and thus the total weight of the electro-chemical device can be significantly reduced by the processing of very thin films as cover elements.

The cover in accordance with the invention is suitable, in particular, for use in an electro-chemical device which comprises a plurality of electro-chemical cells and a cover in accordance with the invention.

In particular, such an electro-chemical device can be in the form of an accumulator, in the form of a lithium ion accumulator for example.

If the electro-chemical device in accordance with the invention is in the form of an accumulator, it is particularly suitable as a high capacity energy source for driving motor vehicles for example.

In this case, an increase in the range of the motor vehicle is obtained due to the reduction in weight of the electro-chemical device.

If the covering film is provided with reinforcing ribs, then increased mechanical rigidity of the cover element is thereby obtained.

In particular, the attachment of the covering film to a carrier element of the cover can be effected by means of a latching device which can be implemented in the most varied of manners.

The thermoforming process is used for the production of blister packaging for example.

The cover element of the cover in accordance with the invention may, in particular, be in the form of a thermoplastic composite workpiece ("thermoplastic advanced composite") and/or a hybrid part of synthetic material.

Further features and advantages of the invention form the subject matter of the following description and the graphic illustration of an exemplary embodiment.

BRIEF DESCRIPTION OF THE DRAWINGS

Similar or functionally equivalent elements are designated by the same reference symbols in all the figures.

DETAILED DESCRIPTION OF THE INVENTION

Figure 1:
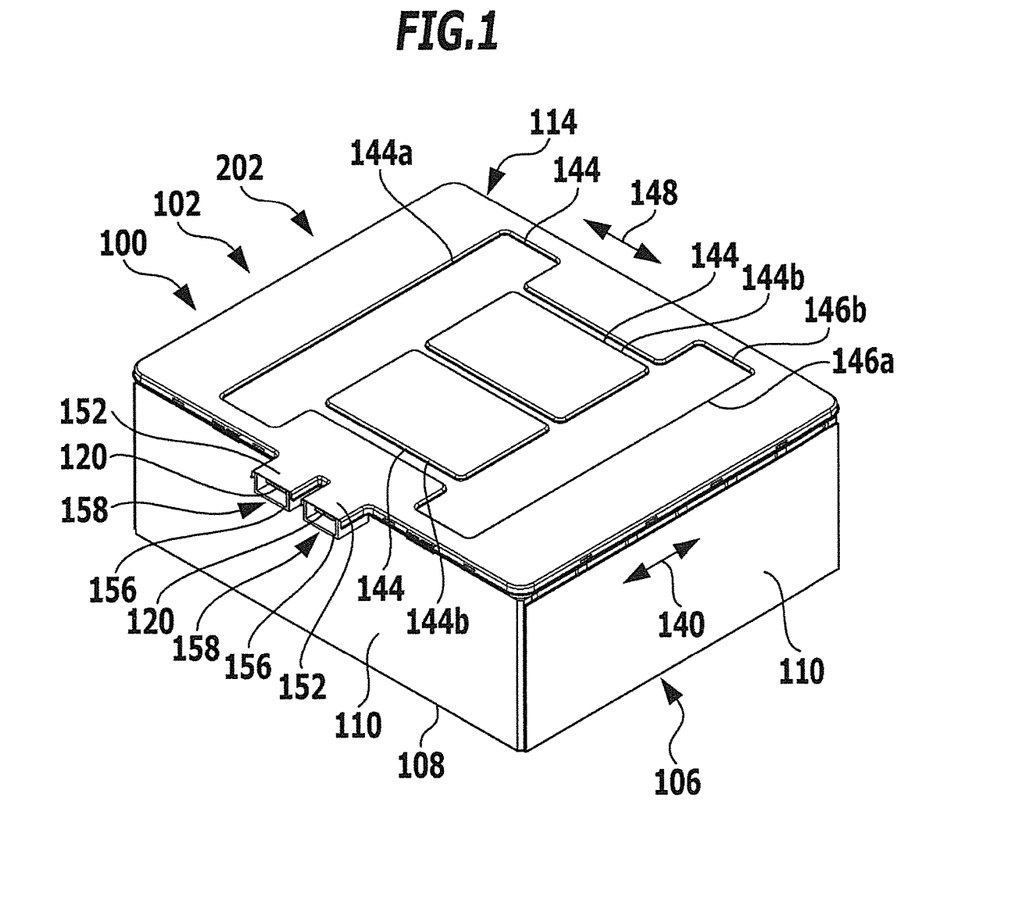
FIG. 1 shows a schematic perspective illustration of an accumulator module with a housing in which a plurality of electro-chemical cells are arranged and which is closed by a cover that comprises a carrier element and a cover element connected to the carrier element.
Figure 2:
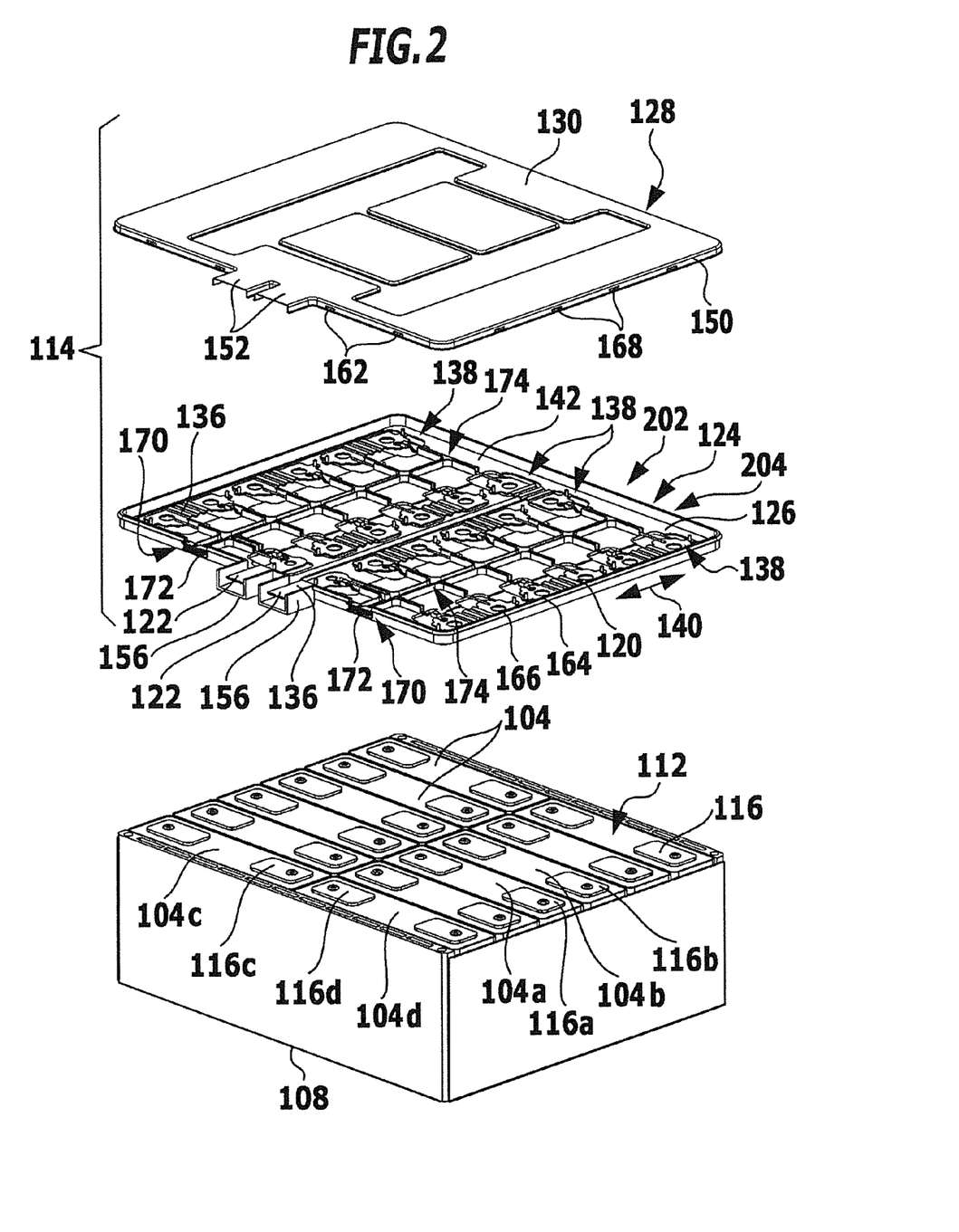
FIG. 2 shows a schematic perspective exploded illustration of the accumulator module depicted in FIG. 1 in which the housing of the accumulator module with the electro-chemical cells arranged therein, the carrier element with the cell connectors arranged therein and conduit systems for connecting voltage tapping points and temperature measuring points of the cell connectors to multipolar terminal plugs are shown.

For example, an electro-chemical device designated as a whole by 100 comprises a plurality of electro-chemical modules 102 each of which comprises a plurality, twelve in the illustrated exemplary embodiment, of electro-chemical cells 104 which are arranged next to each other in a housing 106 of the electro-chemical module 102 (see FIGS. 1 and 2).

The housing 106 may, for example, be substantially parallelepipedal in shape and comprise a bottom wall 108 and side walls 110 which extend away from the bottom wall 108 and the edges whereof remote from the bottom wall 108 surround a housing opening 112 which is closable by means of a cover 114.

The electro-chemical cells 104 are arranged and aligned in the housing 106 of the electro-chemical module 102 in such a way that the two cell terminals 116 of each electro-chemical cell 104 are arranged on the side of the respective electro-chemical cell 104 facing the cover 114.

In each electro-chemical cell 104, one of the cell terminals 116 forms a negative pole 118a and the other respective cell terminal 116 forms a positive pole 118b of the associated electro-chemical cell 104.

The electro-chemical device 100 may, in particular, be in the form of an accumulator particularly a lithium ion accumulator of the type LiFePO$_4$ for example.

The electro-chemical modules 102 may be formed accordingly as accumulator modules and the electro-chemical cells 104 as accumulator cells, in particular, as lithium ion accumulator cells of the type LiFePO$_4$ for example.

Furthermore, the electro-chemical module 102 comprises a plurality of cell connectors 120 (see FIGS. 2 and 3 in particular) by means of which the cell terminals 116 of mutually neighboring electro-chemical cells 104 of different polarity are connectable to each other in electrically conductive manner in order to connect all the electro-chemical cells 104 of an electro-chemical module 102 electrically in series in this way.

In connection therewith, each cell connector 120 connects a first cell terminal 116a of negative polarity of a first electro-chemical cell 104a to a second cell terminal 116b of positive polarity of a neighboring second electro-chemical cell 104b (see FIG. 2).

Figure 3:
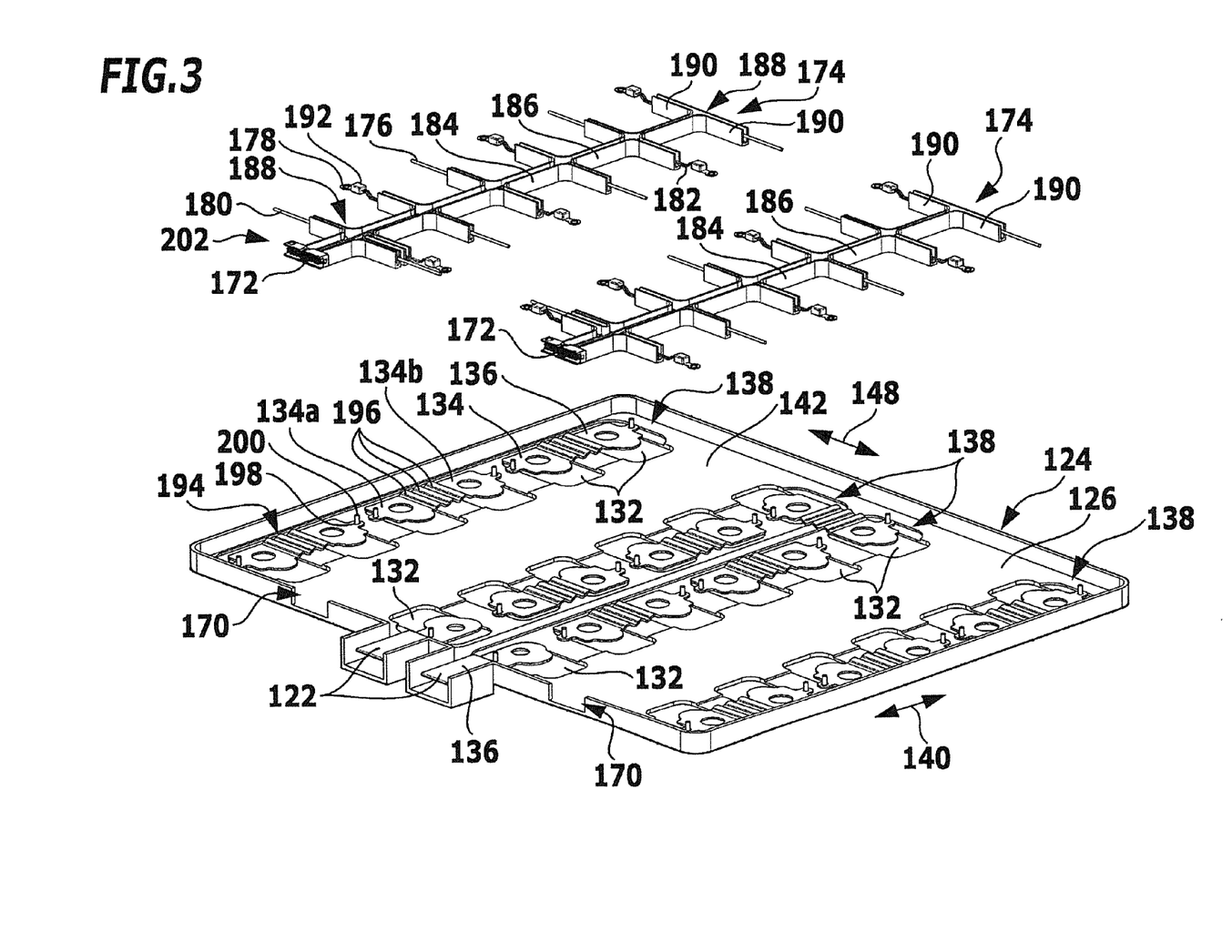
FIG. 3 shows a further schematic perspective exploded illustration of the carrier element with the cell connectors arranged therein and the conduit system.

In each case, a cell terminal 116c of the electro-chemical cell 104c forming the beginning of the series connection of the cells in the electro-chemical module 102 and a cell terminal 116d of the electro-chemical cell 104d forming the end of the series connection of cells are respectively connected in electrically conductive manner to an electrically conductive power terminal 122 of the electro-chemical module 102 (see FIGS. 1 and 3).

The plurality of electro-chemical modules 102 of the electro-chemical device 100 are preferably connected electrically in series.

In particular, such a series circuit can be produced by connecting an electrical power terminal 120 of a first electro-chemical module to an electrical power terminal 120 (of opposite polarity) of a second electro-chemical module in electrically conductive manner by means of a (not illustrated) module connector.

The cover 114 which is positionable on the housing 106 and which, in the mounted state, closes the housing opening 112 is illustrated in detail in FIGS. 2 and 3.

The cover 114 comprises a carrier element 124 in the form of a preferably substantially rectangular carrier board 126 for example, and a cover element 128 in the form of a preferably substantially rectangular covering film 130 which is held on the carrier element 124.

As can best be seen from FIG. 3, the carrier element 124 is provided with a plurality of passage openings 132, wherein each access opening 132 is associated with a respective contact region 134 of a functional element 136 of the electro-chemical device 100 particularly of the electro-chemical module 102, and especially with a contact region 134 of a cell connector 120 or a power terminal 122, and with a respective cell terminal 116 of the electro-chemical cells 104 of the electro-chemical device 100 particularly of the electro-chemical module 102, so that a cell terminal 116 is connectable through such a passage opening 132 to a respectively associated contact region 134 of a functional element 136.

In connection therewith, a cell terminal 116, for example, can extend through the passage opening 132 in order to make contact with a contact region 134 of a functional element 136.

As an alternative thereto, a contact region 134 of a functional element 136 may also extend through the respectively associated passage opening 132 in order to make contact with the respectively associated cell terminal 116.

Furthermore, it is also conceivable for both the cell terminal 116 and the contact region 134 of the functional element 136 to each extend into the interior of the passage opening 132 and be connected to one another therein.

As can be seen from FIGS. 2 and 3, the passage openings 132 of the carrier element 124 can be arranged in a plurality of rows 138, whereby the rows 138 extend in a longitudinal direction 140 of the carrier element 124 for example.

In particular, the passage openings 132 can be of substantially rectangular shape; in principle however, other shapes of passage openings are possible; in particular, circular, oval, square or polygonal passage openings 132.

The cover element 128, which serves for covering the functional elements 136 particularly the cell connector 120 and the power terminals 122, is arranged on the outer surface 142 of the carrier element 124 remote from the electro-chemical cells 104 in the mounted state of the cover 114.

The cover element 128 is in the form of a film and has an average material thickness of at most approximately 1.5 mm.

In order to save weight and material, provision is preferably made for the average material thickness of the cover element 128 to preferably amount to at most approximately 1.0 mm, in particular, to at most approximately 0.6 mm.

The cover element 128 is preferably in the form of a deep-drawn part.

In particular, the cover element 128 can be manufactured by one of the manufacturing processes thermoforming or in-mold-forming.

The thermoforming process or thermoforming is a process for the shaping of thermoplastic synthetic materials which is also called heat forming, deep-drawing or vacuum deep-drawing. In the case of thermoforming films (up to a material thickness of approximately 1.5 mm), the semi-finished film that is to be reshaped can be supplied to a thermoforming automat from a roll.

In one possible implementation of the thermoforming process, the film is heated on one or both sides in a heating station by means of radiant heaters. The film is held fast by means of a clamping frame in a tool station. A pre-stretcher and a thermoforming tool pass through the film plane and roughly define the contour being sought. The film is then subjected to compressed air on the one side and vacuum on the other side in order to rapidly move the film to the (e.g. water-cooled) wall of a forming tool. The air between the film and the forming tool escapes through holes or slots. The cooled film that has now been rigidly shaped is separated from the forming tool and supplied to a stamping station. There, the overall dimension and possibly also holes are punched into the finished workpiece. Subsequently, the finished shaped workpiece is removed from the thermal molding machine and stacked and/or packed for example.

The cover element preferably comprises a thermoplastic material, in particular, polypropylene.

Preferably, the cover element is formed substantially entirely from a thermoplastic material, in particular, from polypropylene.

In order to achieve adequate mechanical rigidity of the cover element 128, the cover element 128 can be provided with reinforcing channels 144 and/or with reinforcing ribs.

The reinforcing channels 144 preferably an annular enclosed configuration.

Each reinforcing channel 144 may comprise sections 146a which are aligned substantially in parallel with the longitudinal direction 140 of the carrier element 124 and the cover element 128 for example, and sections 146b which are aligned substantially parallel to a transverse direction 148 of the carrier element 124 and the cover element 128 for example, whereby the transverse direction 148 runs substantially perpendicularly to the longitudinal direction 140.

As can be seen from FIGS. 1 and 2, provision may be made, in particular, for at least an outer reinforcing channel 144a to include one or more reinforcement reinforcing channels 144b lying within the reinforcing channel 144.

Furthermore, as can be seen from FIGS. 1 and 2, the cover element 128 is preferably provided with an edge region 150 which extends along its outer edge and projects towards the carrier element 124 in the mounted state of the cover 114.

The edge region 150 may be interrupted by two through channel elements 152 which project outwardly from the edge of the cover element 128 in the longitudinal direction 140 for example, and which may have a substantially U-shaped cross-section for example.

As can best be seen from FIG. 2, the carrier element 124 is also preferably provided with an edge region 154 which extends along its outer edge and projects towards the cover element 128 in the mounted state of the cover 114.

The edge region 154 of the carrier element 124 may also be interrupted by two through channel elements 156 which project outwardly from the edge of the carrier element 124, preferably in the longitudinal direction 140, and which may have a substantially U-shaped cross-section for example.

The through channel elements 156 of the carrier element 124 and the through channel elements 152 of the cover element 128 are arranged at mutually corresponding positions of the respective edge regions 154 and 150 with their open sides facing each other so that the through channel elements 156, 152 together form a through shaft 158 which serves for accommodating a respective one of the power terminals 122 of the electro-chemical module 102.

Each power terminal 122 is connected in the mounted state of the electro-chemical module 102 to a cell terminal 116c of the first electro-chemical cell 104c of the series connection of the electro-chemical module 102 or to a cell terminal 116d of the last electro-chemical cell 104d of the series connection of the electro-chemical module 102.

In order to enable the cover element 128 to be fixed to the carrier element 124 in a releasable manner, there is preferably provided a latching device 160 which comprises one or more latching elements 162 that are provided on the cover element 128 and one or more latching elements 164 that are provided on the carrier element 124.

As can be seen from FIG. 2, the latching element 164 on the carrier element side may be in the form of an outwardly protruding latching bead 166 surrounding an edge of the edge region 154 of the carrier element 124 which faces the cover element 128 for example.

The latching elements 162 on the cover element side may be in the form of a plurality of latching projections 168 which protrude inwardly from the edge region 150 of the cover element 128 for example and succeed one another in the peripheral direction of the cover element 128.

When the cover element 128 is placed on the carrier element 124 from above, the latching projections 168 pass by the latching bead 166 due to resilient deformation of the edge region 150 of the cover element 128 and/or of the latching bead 166 of the carrier element 124 and engage underneath the latching bead 166 so that the cover element 128 is secured to the carrier element 124 by a latching process.

Self-evidently, the latching elements 162 can be formed on the cover element 128 and the latching elements 162 on the carrier element 124 or else formed in any other way insofar as they merely enable mutual latching of the cover element 128 and the carrier element 124.

The latching elements 162 of the cover element 128 can be formed into the cover element 128 or embossed thereon or formed on the cover element 128.

The edge region 154 of the carrier element 124 is preferably provided with one or more recesses 170 for respectively accommodating a preferably multipolar plug 172.

Each plug 172 serves for connecting a conduit system 174 arranged on the carrier element 124 to a (not illustrated) monitoring unit of the electro-chemical device 100 via a (not illustrated) preferably multipolar connection line.

Two such conduit systems 174 are present in the embodiment of an electro-chemical module 102 illustrated in the Figures.

Each of the conduit systems 174 serves for connecting a plurality of voltage tapping points 176 and a plurality of temperature measuring points 178 of the electro-chemical module 102 to the (not illustrated) monitoring unit of the electro-chemical device 100.

Each conduit system 174 comprises a plurality of voltage tapping lines 180 which lead from a respective voltage tapping point 176 to the plug 172 of the conduit system 174, and a plurality of temperature measuring lines 182 which lead from a respective temperature measuring point 178 to the plug 172 of the conduit system 174, as well as a reinforcement structure 184 on which the voltage tapping lines 180 and the temperature measuring lines 182 are arranged at least in sections thereof.

The reinforcement structure 184 of each conduit system 174 is preferably built up in a tree-like manner and comprises a main accommodating channel element 186 which extends in the longitudinal direction 140 of the cover 114 for example, and a plurality of auxiliary accommodating channel elements 190 which branch off from the main accommodating channel element 186 at the branching points 188.

Hereby, provision is made in particular for the main accommodating channel element 186 to accommodate a plurality of voltage tapping lines 180 and temperature measuring lines 182 of the conduit system 174, whereas each of the auxiliary accommodating channel elements 190 preferably accommodates just one voltage tapping line 180 and/or just one temperature measuring line 182.

The main accommodating channel element 186 and/or the auxiliary accommodating channel elements 190 preferably have a substantially U-shaped cross-section which is open to the side of the reinforcement structure 184 remote from the carrier element 124 so that the voltage tapping lines 180 and the temperature measuring lines 182 can be inserted into the reinforcement structure 184 from this side.

The reinforcement structure 184 is preferably formed in one-piece manner and may, in particular, comprise an injection moldable material such as PBT (polybutylene terephthalate), PP (polypropylene), PA (polyamide), ABS (acrylonitrile butadiene styrene) and/or LCP ("Liquid Crystal Polymer") for example.

As an alternative or in addition thereto, provision may also be made for the reinforcement structure 184 to comprise a metallic material such as aluminum for example, and in particular, a metallic shaped part such as a punched-bent-part for example.

The reinforcement structure 184 may comprise one or more retaining devices by means of which the voltage tapping lines 180 and the temperature measuring lines 182 are fixed to the reinforcement structure 184, preferably in a releasable manner.

Such retaining devices may be in the form of hooks, clamps, latching elements, clips or the like which are arranged on the reinforcement structure 184 and/or on the lines 180 or 182 for example.

In turn, each reinforcement structure 184 of a conduit system 174 can be fixed as a whole, especially in releasable manner, to the outer surface 142 of the carrier element 124 which faces the cover element 12 in the mounted state of the cover 114.

The fixing of the reinforcement structure 184 to the carrier element 124 can be effected by a latching arrangement, welding and/or adhesion for example.

As an alternative thereto, provision may also be made for the reinforcement structure 184 to be formed in one-piece manner with the carrier element 124.

The end of each voltage tapping line 180 is connected in electrically conductive manner to a respective contact region 134 of a cell connector 120 or to a power terminal 122 of the electro-chemical module 102 in order to enable the electrical potential prevailing there to be measured.

The end of each temperature measuring wire 182 is connected to a respective temperature sensor 192 in the form of an NTC element ("Negative Temperature Coefficient") for example. Each temperature sensor 194 is likewise in contact with a contact region 134 of a cell connector 120 or with a power terminal 122 of the electro-chemical module 102 in order to enable the temperature prevailing there to be measured.

Each of the contact regions 134 of the cell connector 120 and each power terminal 122 is associated with a respective cell terminal 114 of the electro-chemical module 102 and, in the assembled state of the electro-chemical module 102, is connected in electrically conductive manner to the cell terminal 114 associated therewith, preferably by a substance-to-substance bond.

Each cell connector 120 comprises two contact regions 134a and 134b for electrically contacting a cell terminal 114 and a compensation region 194 which connects the two contact regions 134a and 134b together. The compensation region 194 is preferably deformable in resilient and/or plastic manner in order to enable relative movement of the two contact regions 134a and 134b of the cell connector 120 relative to each other when the electro-chemical device 100 is in operation and/or to compensate for tolerances when assembling the electro-chemical device 100.

For this purpose in particular, the compensation region 194 may comprise one or more compensation undulations 196 which run transversely relative to a direction of connection which connects a center of the first contact region 134a and a center of the second contact region 134b of the cell connector 120 to one another.

Each contact region 134 of the cell connector 120 and the power terminals 122 are positionable on a respectively associated positioning pin 200 of the carrier element 124 by means of a respective positioning hole 198.

In connection therewith, the positioning pin 200 of the carrier element 124 preferably passes through the respectively associated positioning hole 198 of the cell connector 120 or the power terminal 122.

The cover 114 of the electro-chemical module 102, which comprises the carrier element 124 including the conduit systems 174 and the functional elements 136 as well as the cover element 128, forms a cell contacting system 202 for contacting and monitoring the electro-chemical cells 104 of the electro-chemical module 102.

The carrier element 124 preferably comprises an electrically non-conductive synthetic material such as PBT, PP, PA, ABS and/or LCP for example, and is preferably formed substantially in its entirety from such a synthetic material.

A particularly suitable material for the carrier element 124 is a polypropylene material reinforced with talc (such as the material designated PP TV20 for example). This material has a particularly high inherent stability due to the reinforcing effect of the talc.

The carrier element 124 and the conduit systems 174 as well as the cell connectors 120 and the power terminals 122 are preferably completely pre-assembled as separate assemblies 204.

During this pre-assembly process, the cell connectors 120 and the power terminals 122 are positioned on the carrier element 124 and the voltage tapping lines 180 and the temperature measuring lines 182 are connected to the cell connectors 120 and the power terminals 122 as well as to the plugs 172 and then fixed to the reinforcement structures 184 of the conduit systems 174, preferably in a releasable manner.

Furthermore, if the reinforcement structures 184 are not already connected to the carrier element 124 in one-piece manner for example, the reinforcement structures 184 are fixed to the outer surface 142 of the carrier element 124.

Consequently, all of the components needed for contacting the electro-chemical cells 104 of an electro-chemical module 102 are incorporated, with the requisite relative positioning, in an assembly 204 that is manageable as a unit.

In particular, the cell connectors 120, the power terminals 122 and/or the reinforcement structures 184 of the conduit systems 174 can be fixed to the carrier element 124 by latching, welding and/or clipping.

When assembling an electro-chemical module 102, the carrier element 124 of the cover 114 is placed on the housing 106 in which the electro-chemical cells 104 are arranged, and connected to the edge of the housing 106 surrounding the housing opening 110.

Subsequently, the functional elements 136 and particularly the cell connectors 120 and the power terminals 122 are contacted in electrically conductive manner by the respectively associated cell terminals 114 of the electro-chemical module 102, for example by means of a welding process especially by means of a laser, and in particular through the passage openings 132 of the carrier element 124 which are freely accessible as the cover element 128 has not yet been put in place.

After contact has been made between the functional elements 136 and the cell terminals 114 of the electro-chemical cells 104 of the electro-chemical module 102, the cover element 128 is placed on the carrier element 124 and connected thereto, in particular, by means of a latching process so that the cover element 128 covers the functional elements 136 and the passage openings 132 of the carrier element 124 as well as the conduit systems 174 and protects them from being touched inadvertently.

Damage to the cell contacting system 202 is thereby prevented during the transportation process and during the process of assembling the electro-chemical module 102.

The fully assembled electro-chemical module 102 can be combined with a plurality of other electro-chemical modules 102 to form the electro-chemical device 100, whereby in particular, different electro-chemical modules 102 can be connected together by means of (not illustrated) module connectors which connect the power terminals 122 of different electro-chemical modules 102 to one another.

That which is claimed:

1. A cover for an electro-chemical device which comprises a plurality of electro-chemical cells, comprising a carrier element on which there is arranged at least one cell connector for connecting a first cell terminal of a first electro-chemical cell and a second cell terminal of a second electro-chemical cell in an electrically conductive manner, and
   a cover element for covering the at least one cell connector, wherein the cover element comprises a covering film,
   wherein the covering film is provided with at least one stiffening bead and/or with at least one reinforcing rib,
   wherein the covering film is latched to the carrier element, and
   wherein the cover element has an average material thickness of at most 1.0 mm.

2. The cover in accordance with claim 1, wherein the cover element is in the form of a deep-drawn part.

3. The cover in accordance with claim 1, wherein the cover element is manufactured by a thermoforming process or an in-mold-forming-process.

4. The cover in accordance with claim 1, wherein the cover element comprises an edge region which projects towards the carrier element and at which the cover element is connected to the carrier element.

5. The cover in accordance with claim 4, wherein the edge region of the cover element at least partly overlaps an edge region of the carrier element which projects towards the cover element.

6. The cover in accordance with claim 1, wherein the cover element comprises a thermoplastic material.

7. The cover in accordance with claim 1, wherein the cover comprises at least one cell connector for connecting a first cell terminal of a first electro-chemical cell of the electro-chemical device and a second cell terminal of a second electro-chemical cell of the electro-chemical device in an electrically conductive manner.

8. The cover in accordance with claim 7, wherein at least one cell connector is arranged between the carrier element and the cover element.

9. The cover in accordance with claim 7, wherein the carrier element has at least one passage opening through which a contact region of a cell connector is connectable to a cell terminal of an electro-chemical cell of the electro-chemical device.

10. The cover in accordance with claim 1, wherein the cover comprises at least one conduit system for connecting a plurality of voltage tapping points and/or temperature measuring points of the electro-chemical device to a monitoring unit of the electro-chemical device, which conduit system comprises multiple voltage tapping lines and/or multiple temperature measuring lines.

11. The cover in accordance with claim 10, wherein the conduit system is arranged between the carrier element and the cover element.

12. The cover in accordance with claim 1, wherein the cover comprises at least one through channel for accommodating a power terminal of the electro-chemical device.

* * * * *